United States Patent
Injarapu et al.

(10) Patent No.: US 12,493,514 B2
(45) Date of Patent: Dec. 9, 2025

(54) APPARATUS AND METHODS FOR MEMORY FAULT DETECTION WITHIN DIE ARCHITECTURES

(71) Applicant: QUALCOMM Incorporated, San Diego, CA (US)

(72) Inventors: Sateeshkumar Injarapu, Bangalore (IN); Manish Kumar Saxena, Bangalore (IN); Amit Duggal, Bangalore (IN); Nitin Jaiswal, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 96 days.

(21) Appl. No.: 18/473,108

(22) Filed: Sep. 22, 2023

(65) Prior Publication Data

US 2025/0103420 A1 Mar. 27, 2025

(51) Int. Cl.
*G06F 11/00* (2006.01)
*G06F 11/07* (2006.01)
*G06F 11/10* (2006.01)

(52) U.S. Cl.
CPC ........ *G06F 11/079* (2013.01); *G06F 11/0784* (2013.01); *G06F 11/102* (2013.01)

(58) Field of Classification Search
CPC .. G06F 11/079; G06F 11/0784; G06F 11/102; H03M 13/3906; G11C 16/26
See application file for complete search history.

(56) References Cited

U.S. PATENT DOCUMENTS

| | | | |
|---|---|---|---|
| 6,381,726 B1 * | 4/2002 | Weng | H03M 13/3738 714/755 |
| 8,539,303 B2 * | 9/2013 | Lu | H03M 13/05 714/755 |
| 10,116,336 B2 * | 10/2018 | Hu | H03M 13/3738 |
| 11,474,897 B2 * | 10/2022 | Mills | G06F 3/0619 |

(Continued)

FOREIGN PATENT DOCUMENTS

DE 102018131613 A1 10/2019

OTHER PUBLICATIONS

Related PCT Patent Application, International Search Report and Written Opinion—PCT/US2024/040055—ISA/EPO—Oct. 14, 2024.

*Primary Examiner* — Jonathan D Gibson
(74) *Attorney, Agent, or Firm* — Smith, Tempel, Blaha, LLC

(57) ABSTRACT

Methods and apparatuses directed to memory fault detection mechanisms within die architectures. In some examples, a die package includes decoder logic that receives multiple data words, and a first error correcting code for each of the data words. The decoder logic generates, for each of the data words, a second error correcting code based on a corresponding one of the data words. Further, the decoder logic generates, for each of the data words, an error status based on the first error correcting code and the second error correcting code that corresponds to each of the data words. The die package also includes error generation logic that receives the error status for the data words from the decoder logic, and generates error data based on a combination of the error statuses for the data words. The error generation logic can store the error data in a memory device.

18 Claims, 7 Drawing Sheets

(56) References Cited

U.S. PATENT DOCUMENTS

| | | | | |
|---|---|---|---|---|
| 2003/0070133 A1* | 4/2003 | Bauman | ............... | G06F 11/1044 |
| | | | | 714/763 |
| 2010/0192040 A1* | 7/2010 | Yedidia | ............... | H03M 13/658 |
| | | | | 714/755 |
| 2013/0198571 A1* | 8/2013 | Brewerton | .......... | G06F 11/1645 |
| | | | | 714/37 |
| 2015/0349807 A1* | 12/2015 | Vernon | ............. | H03M 13/3715 |
| | | | | 714/774 |
| 2016/0085622 A1* | 3/2016 | Andre | ................ | G06F 11/1048 |
| | | | | 714/764 |
| 2016/0350181 A1* | 12/2016 | Cha | ..................... | G06F 11/1068 |
| 2018/0152207 A1* | 5/2018 | Watanabe | ........... | G06F 11/1068 |
| 2020/0104205 A1* | 4/2020 | Noguchi | ............... | G06F 11/102 |
| 2022/0116057 A1* | 4/2022 | Doubchak | .......... | H03M 13/1108 |
| 2023/0259422 A1* | 8/2023 | Chung | ................ | G06F 11/1048 |
| | | | | 714/767 |
| 2023/0409426 A1* | 12/2023 | Gurumurthi | ........ | G06F 11/0772 |
| 2024/0211336 A1* | 6/2024 | Injarapu | ............. | G06F 11/0781 |
| 2024/0303157 A1* | 9/2024 | Schaefer | ............. | G06F 11/079 |
| 2024/0428876 A1* | 12/2024 | Injarapu | ................ | G11C 29/10 |
| 2025/0103420 A1* | 3/2025 | Injarapu | ............. | G06F 11/1048 |

* cited by examiner

APPARATUS AND METHODS FOR MEMORY FAULT DETECTION WITHIN DIE ARCHITECTURES

BACKGROUND

Field of the Disclosure

This disclosure relates generally to die architectures and, more particularly, to detecting memory faults within die architectures.

Description of Related Art

Die architectures often include memory components that store data. For example, an integrated circuit may include a processor and a memory device, where the processor is able to write data to the memory device, and read data from the memory device. Sometimes, data errors occur due to various reasons. For example, data being written to memory may experience one or more data bit flips (e.g., due to timing issues), where an intended value of 0 or 1 being written to memory is stored as a value of 1 or 0, respectively. Similarly, data may be corrupted when being read out of memory, or even while stored in memory (e.g., due to random alpha particle bombardment, etc.). In some instances, the memory device may endure a hard error (e.g., a stuck signal or memory bit) that may cause data corruption to one or more memory locations. As a result, data being written to or read from these memory locations may be corrupted. To detect these data errors, some systems employ an error correction mechanism such as error correcting code (ECC). These error correction mechanisms can be costly in terms of die real estate required, and can require multiple signals to detect data errors, among other drawbacks. As such, there are opportunities to address these and other issues associated with error correction mechanisms within die architectures.

SUMMARY

According to an aspect, a die package includes a processor communicatively coupled to a memory device. The processor is configured to receive a plurality of data words, and a first error correcting code for each of the plurality of data words. The processor is also configured to generate, for each of the plurality of data words, a second error correcting code based on a corresponding one of the plurality of data words. Further, the processor is configured to generate, for each of the plurality of data words, an error status based on the first error correcting code and the second error correcting code corresponding to each of the plurality of data words. In addition, the processor is configured to generate error data based on the error statuses for the plurality of data words. The processor is further configured to transmit an error signal to at least one component electrically coupled to the die package based on the error data.

According to another aspect, a method by a processor includes receiving a plurality of data words, and a first error correcting code for each of the plurality of data words. The method also includes generating, for each of the plurality of data words, a second error correcting code based on a corresponding one of the plurality of data words. Further, the method includes generating, for each of the plurality of data words, an error status based on the first error correcting code and the second error correcting code corresponding to each of the plurality of data words. In addition, the method includes generating error data based on the error statuses for the plurality of data words. The method further includes transmitting an error signal to at least one component based on the error data.

According to yet another aspect, a non-transitory, machine-readable storage medium comprises instructions that, when executed by at least one processor, cause the at least one processor to perform operations. The operations include receiving a plurality of data words, and a first error correcting code for each of the plurality of data words. The operations also include generating, for each of the plurality of data words, a second error correcting code based on a corresponding one of the plurality of data words. Further, the operations include generating, for each of the plurality of data words, an error status based on the first error correcting code and the second error correcting code corresponding to each of the plurality of data words. In addition, the operations include generating error data based on the error statuses for the plurality of data words. The operations further include transmitting an error signal to at least one component based on the error data.

According to even another aspect, a die package includes decoder logic and error generation logic. The decoder logic is configured to receive a plurality of data words, and a first error correcting code for each of the plurality of data words. The decoder logic is also configured to generate, for each of the plurality of data words, a second error correcting code based on a corresponding one of the plurality of data words. Further, the decoder logic is configured to generate, for each of the plurality of data words, an error status based on the first error correcting code and the second error correcting code corresponding to each of the plurality of data words. In addition, the error generation logic is configured to receive the error status for each of the plurality of data words, and generate error data based on the error statuses for the plurality of data words. The error generation logic is further configured to transmit an error signal to at least one component electrically coupled to the die package based on the error data.

DETAILED DESCRIPTION

Figure 1A:
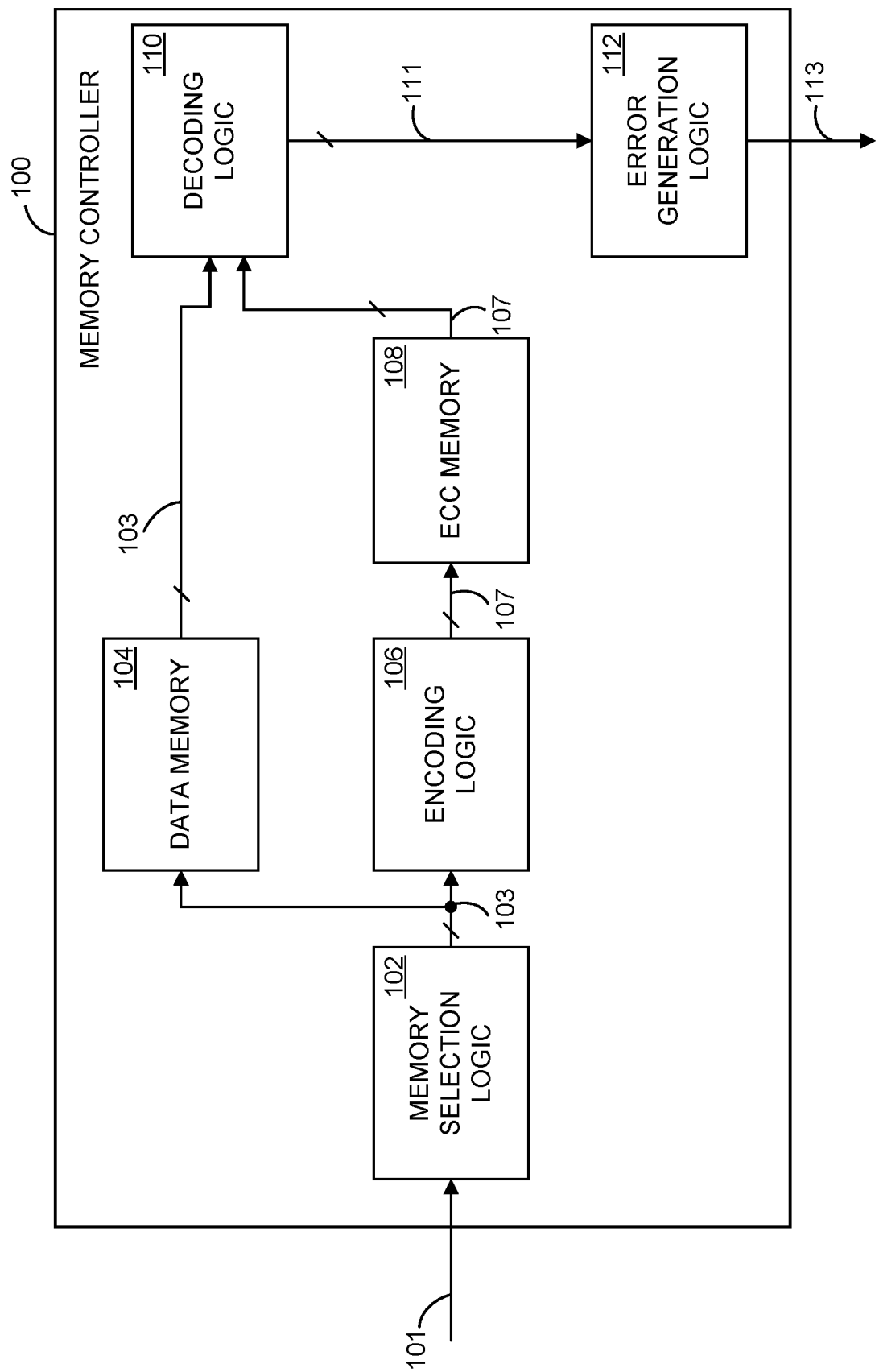
FIG. 1A is block diagram of a memory controller, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein are directed to memory fault detection mechanisms within die architectures, such as memory fault detection mechanisms within processors. These die architectures can be used in various applications, such as within safety critical systems (e.g., to support of safety critical features in automotive systems). The embodiments may employ decoders, such as error correcting code (ECC) decoders, to generate an error correcting code for each of multiple (e.g., four) data words (e.g., 8-bit words, 16-bit words, 32-bit words, 64-bit words, etc.), and may generate an error status based on the error correcting codes for the data words. For instance, rather than providing a memory address and an error correcting code for each of the multiple data words, the embodiments may consolidate the error correcting codes for the multiple data words into a single error status. The generated error status may indicate a consolidated error for the multiple data words. In some examples, the embodiments may further identify one or more of the data words that had an error, and/or a corresponding memory address.

Among other advantages, the embodiments can reduce the amount of die real estate needed for error correction. For instance, rather than requiring multiple data signals to provide, for each of the multiple data words, an error correcting code that includes a memory address and a corresponding error correcting code (e.g., 10 bit memory address and 3 bit error correcting code), the embodiments may provide a single error correcting code (e.g., 3 bit error correcting code) based on the errors detected for the multiple data words. In addition, rather than providing a memory address to each of the decoders to generate the corresponding error correcting code, the embodiments capture the memory address once, and can provide the memory address with the single error correcting code. For instance, the embodiments may provide the single error correcting code (e.g., 3 bit consolidated error correcting code) with the corresponding memory address (e.g., 10 bit memory address). As a result, the embodiments can reduce the error logic area by, for instance, 75% (by providing a single 13 bit error status rather than four 13 bit error statuses).

Turning to FIG. 1A, a memory controller 100 includes memory selection logic, encoding logic 106, data memory 104, ECC memory 108, decoding logic 110, and error generation logic 112. The memory controller 100 may be employed within any suitable die architecture, such as within a graphical processing unit (GPU), a central processing unit (CPU), a microcontroller, or any other suitable integrated circuit. In this example, memory selection logic 102 receives an instruction 101 to write a word of data to data memory 104. The instruction 101 may be to write multiple data bytes (e.g., four data bytes) to the data memory 104, for instance. The memory selection logic 102 may enable one or more memory locations of the data memory 104 for writing the multiple data bytes, and may store the multiple data bytes 103 to the enabled memory locations of the data memory 104.

In addition, the memory selection logic 102 provides the multiple data bytes 103 to encoding logic 106 to generate error correcting codes 107 (e.g., ECC error correcting codes) for each of the multiple data bytes 103. For example, the encoding logic 106 may include one or more encoders that generate the error correcting codes 107 for each of the multiple data bytes 103. For instance, the error correcting codes may be block codes (e.g., linear, non-linear, Hamming, cyclic, parity, repetition) or convolution codes (e.g., codes that are based on current data and previously encoded data). The encoding logic 106 stores the error correcting codes 107 within ECC memory 108. In some examples, each error correcting code 107 may be composed of five bits (e.g., ECC syndrome bits).

Further, decoding logic 110 reads the data memory 104 to obtain the multiple data bytes 103, and reads the ECC memory 108 to obtain the corresponding error correcting codes 107. Decoding logic 110 may include one or more decoders that generate an error signature 111 based on each data byte 103 and corresponding error correcting code 107. For example, each decoder may generate an error correcting code based on a data byte 103, and compare the generated error correcting code with the error correcting code 107 obtained from ECC memory 108. If the error correcting codes match (e.g., are the same), there is no error. If the error correcting codes do not match, then the decoder detects an error. Each decoder may generate a corresponding error signature 111 based on the error correcting code comparison. Each error signature 111 may identify, for instance, a type of memory error. The memory error may have been caused by a memory error within the data memory 104 storing a corresponding data byte 103, or within the ECC memory 108 storing a corresponding error correcting code 107. In some instances, the error signature 111 may include five bits, where two bits indicates a byte number (e.g., byte 0, byte 1, byte 2, byte 3) of the data byte 103 with the error, and three bits indicates an error correcting code type (e.g., 0b000-no error; 0b001-single error correction (SEC); 0b010-double error detection (DED); and 0b100-check bit error. The check bit error indicates a fault in the memory location that stores the error correcting code (e.g., ECC memory 108). For instance, if a fault occurs in the memory location that stores an ECC code, then the check bit is set indicating a check bit error.

Error generation logic 112 receives the error signatures 111 for the multiple data bytes 103 from decoding logic 110, and generates an error status 113 for the multiple data bytes 103 based on the error signatures 111. The error status 113 may identify a type of error. For example, error generation logic 112 may receive a first error signature 111A for a first data byte 103A, a second error signature 111B for a second data byte 103B, a third error signature 111C for a third data byte 103C, and a fourth error signature 111D for a fourth data byte 103D. Error generation logic 112 may then determine whether any of the first error signature 111A, second error signature 111B, third error signature 111C, and fourth error signature 111D indicate a first type of error, such as a DED error. If any of the first error signature 111A, second error signature 111B, third error signature 111C, and fourth error signature 111D indicate the first type of error, the error generation logic 112 generates the error status 113 to indicate the first type of error. Otherwise, if none of the first error signature 111A, second error signature 111B, third error signature 111C, and fourth error signature 111D indicate the first type of error, the error generation logic 112 determines whether any of the error correcting codes indicate a second type of error, such as an SEC error.

If any of the first error signature 111A, second error signature 111B, third error signature 111C, and fourth error signature 111D indicate the second type of error, the error generation logic 112 generates the error status 113 to indicate the second type of error. Otherwise, if none of the first error signature 111A, second error signature 111B, third error signature 111C, and fourth error signature 111D indicate the second type of error, the error generation logic 112 determines whether any indicate a third type of error, such as a check bit error. If any of the first error signature 111A, second error signature 111B, third error signature 111C, and fourth error signature 111D indicate the third type of error, the error generation logic 112 generates the error status 113 to indicate the third type of error. Otherwise, if none of the first error signature 111A, second error signature 111B, third error signature 111C, and fourth error signature 111D indicate the third type of error, then the error generation logic 112 generates the error status 113 to indicate no error. The error status 113 may include, for example, three bits to identify any of these three types of errors. For example, a value of 0b000 may indicate no error; a value of 0b001 may indicate a single error correction, and a value of 0b010 may indicate a double error detection, and a value of 0b100 may indicate a check bit error.

As described herein, in some examples, the error generation logic 112 generates the error status 113 to further identify the data byte 103 with an error. For instance, as described herein, the error status 113 may include two bits, where a value of 0b00 indicates byte 0, a value of 0b01 indicates byte 1, 0b10 indicates byte 2, and 0b11 indicates byte 3 of four data bytes 103. Further, in some examples, the error generation logic 112 may identify the memory address associated with the detected error. For instance, the error status 113 may include ten bits that identify the memory address.

Figure 1B:
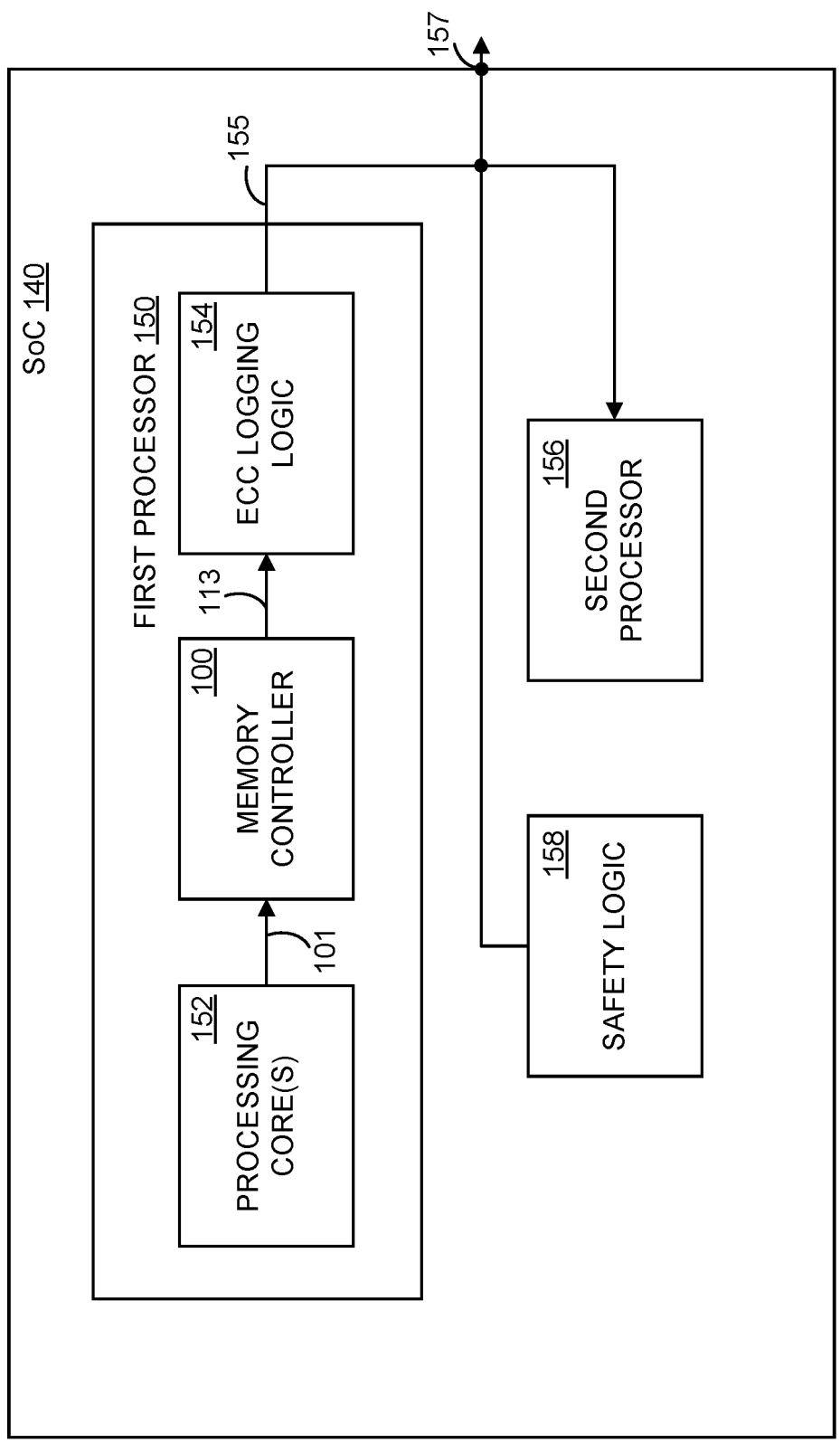
FIG. 1B is block diagram of a die package, according to some implementations

The memory controller 100 of FIG. 1A may be employed in various die architectures. For example, FIG. 1B illustrates a System-on-a-Chip (SoC) 140 that includes memory controller 100 within a first processor 150. The first processor 150 may be, for example, a CPU, a GPU, a microcontroller, or any other suitable processor.

As illustrated, the first processor 150 further includes one or more processing cores 152 and ECC logging logic 154 each electrically coupled to the memory controller 100. Each processing core 152 may provide to memory controller 100 an instruction 101 to store data within memory, such as within data memory 104. The instruction 101 may identify an instruction type for storing one or more data words (e.g., data bytes) in memory, where the instruction type identifies a number of data bytes to write to the memory. For instance, the instruction type may identify a two data byte write (e.g., half precision), a four data byte write (e.g., single precision), or an eight data byte write (e.g., double precision). Based on the instruction type, memory controller 100 may write the one or more data bytes to the data memory 104. In addition, as described herein, memory controller 100 may encode the data bytes written to data memory 104 to generate error correcting codes, such as error correcting codes 107, and may store the generated error correcting codes within memory, such as within ECC memory 108.

Further, to detect if any of the data bytes stored to the data memory 104 and/or error correcting codes stored to the ECC memory 108 include errors, the memory controller 100 may read the data bytes from the data memory 104, and may also read the generated error correcting codes from ECC memory 108. The memory controller 100 may then perform operations to detect if there is an error in any of the read data bytes based on the previously generated error correcting codes. For instance, as described herein, the memory controller 100 may generate an error correcting code for a read data byte, and compare the generated error correcting code with the error correcting code read from ECC memory 108 for the data byte. The memory controller 100 may detect an error if the error correcting codes do not match. Further, the memory controller 100 may generate an error correcting code, such as an error signature 111, based on whether any errors were detected. The memory controller 100 may perform these operations for each of the data bytes (e.g., four data bytes 103), and may generate the error status 113 based on the error correcting code generated for each of the data bytes.

As illustrated in FIG. 1B, ECC logging logic 154 receives the error status 113 from the memory controller 100. Further, ECC logging logic 154 may determine if any errors were detected based on the error status 113, and may generate a memory error signal 155 based on the determination. For example, if the error status 113 indicates an error was detected, such as an SEC error, DED error, or check bit error, ECC logging logic 154 may store error data identifying the detected errors within a memory (e.g., an internal memory), and may further generate the memory error signal 155 indicating that an error was detected. The memory error signal 155 may be an interrupt, such as a FUSA interrupt, for example.

In some examples, the memory error signal 155 is provided off-chip, such as via an input/output (I/O) pin 157 of the SoC 140. In some examples, the memory error signal 155 is provided to other on-chip components, such as to the safety logic 158 and/or the second processor 156. For instance, based on receiving the memory error signal 155 (e.g., as an interrupt), safety logic 158 may disable one or more safety features, such as one or more automotive system safety features (e.g., self-driving, camera sensors, automatic braking, etc.). Similarly, second processor 156 can receive the memory error signal 155, and can perform additional operations, such as the disabling of a safety feature, or the display of a warning message, for example.

Figure 4:
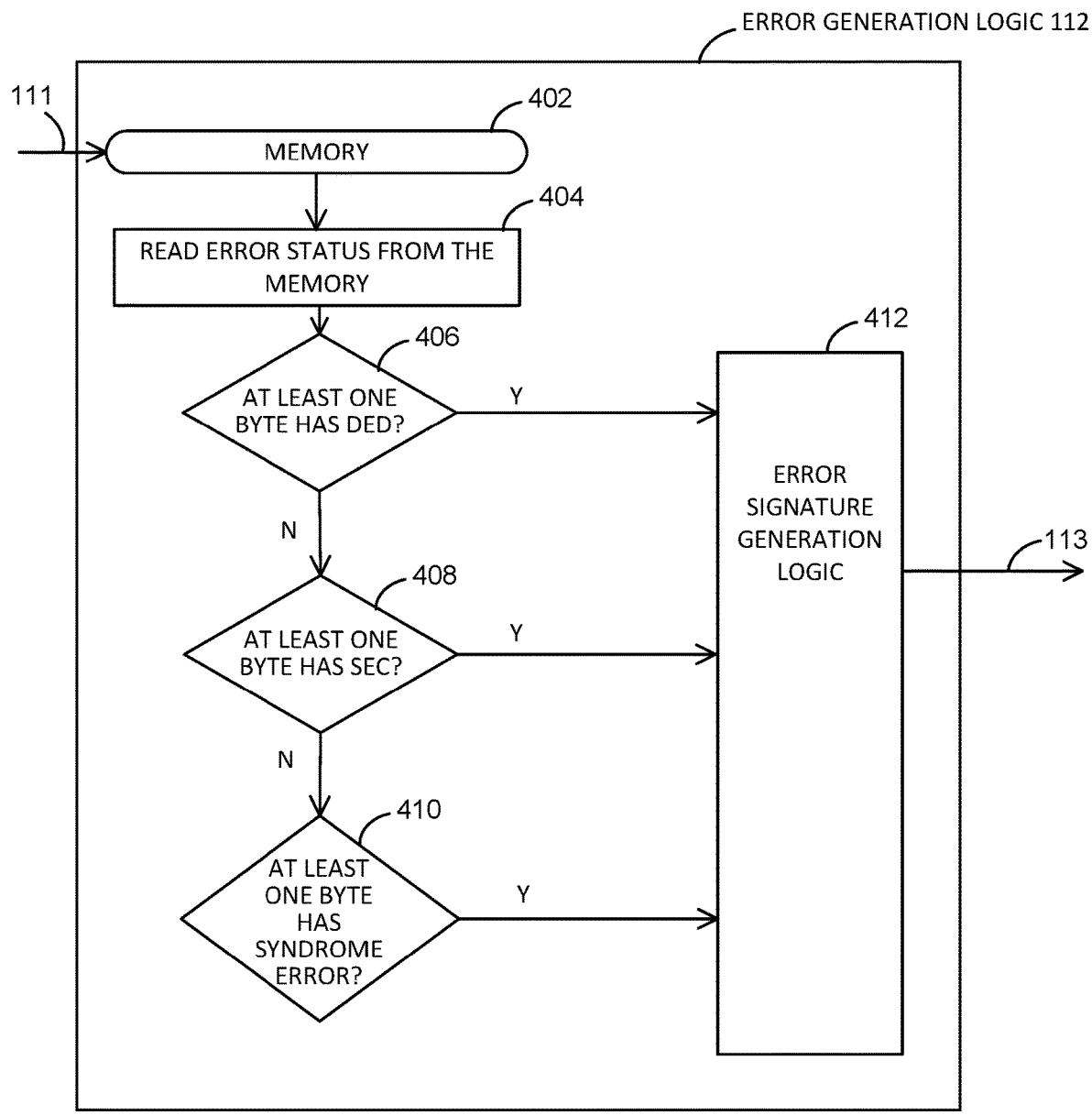
FIG. 4 is a block diagram of error generation logic, according to some implementations.

FIG. 4 illustrates example operations of error generation logic 112. In this example, at block 402, error generation logic 112 receives error signatures 111 identifying errors detected for each of multiple data bytes (e.g., four data bytes), and stores the error signatures 111 into a memory device. Further, at block 404, error generation logic 112 reads the error signatures 111 for the multiple data bytes from the memory device. As described herein, each error signature 111 may identify an error type for each corresponding data byte.

At block 406 error generation logic 112 determines whether at least one of the error signatures 111 indicate a DED error. For instance, error generation logic 112 may compare each error signature 111 to a first predetermined value (e.g., 0b010) to determine whether any error signature 111 indicates a DED error. If at least one error signature 111 indicates a DED error, error signature generation logic 412 generates the error status 113 to indicate the DED error, and transmits the error status 113 indicating the DED error (e.g., to another component or device). If, at block 406, none of the error signatures 111 indicate a DED error, at block 408 error generation logic 112 determines whether any of the error signatures 111 indicate a SEC error. For instance, error generation logic 112 may compare each error signature 111 to a second predetermined value (e.g., 0b001) to determine whether any error signature 111 indicates a SEC error. If at least one error signature 111 indicates a SEC error, error signature generation logic 412 generates the error status 113 to indicate the SEC error, and transmits the error status 113 indicating the SEC error.

Further, if at block 408 none of the error signatures 111 indicate a SEC error, at block 410 error generation logic 112 determines whether any of the error signatures 111 indicate any other type of error, such as a check bit error. For instance, error generation logic 112 may compare each error signature 111 to a third predetermined value (e.g., 0b100) to determine whether any error signature 111 indicates a check bit error. If at least one error signature 111 indicates a check bit error, error signature generation logic 412 generates the error status 113 to indicate the check bit error, and transmits the error status 113 indicating the check bit error. Otherwise, if none of the error signatures 111 indicate an error, error generation logic 112 does not transmit the error status 113, in some examples.

Figure 2:
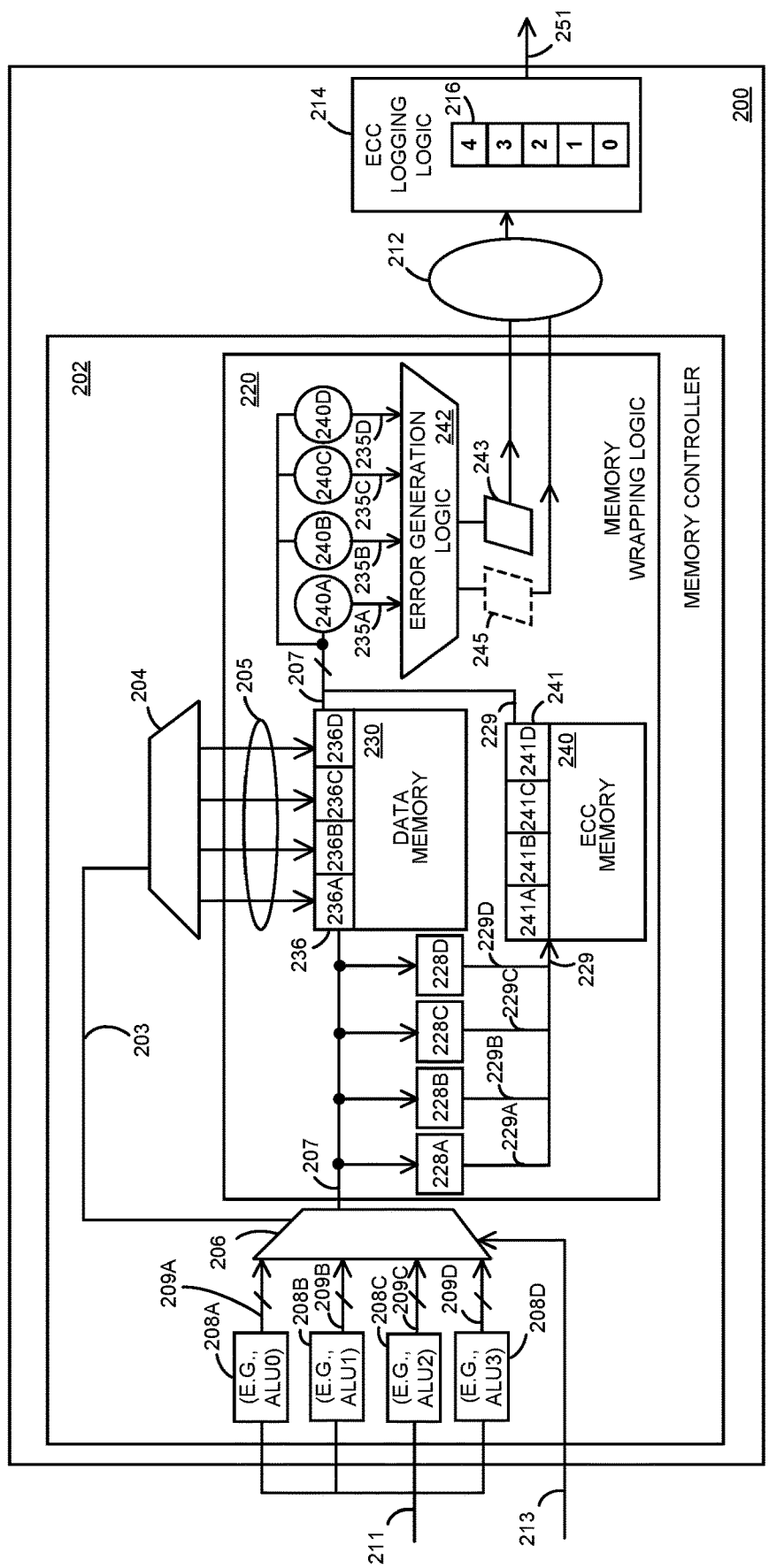
FIG. 2 is block diagram of an integrated circuit, according to some implementations.

FIG. 2 illustrates an integrated circuit 200 that can be implemented, for instance, by a processor (e.g., CPU, GPU), SoC, or any other suitable die package. As illustrated, integrated circuit 200 includes memory controller 202 electrically coupled to ECC data buffer 212, and ECC logging logic 214. In this example, memory controller 202 includes memory wrapping logic 220 electrically coupled to data storage logic 206 and to byte enable logic 204. Memory controller 202 further includes a first data processing unit 208A, a second data processing unit 208B, a third data processing unit 208C, and a fourth data processing unit 208D. Each of the first data processing unit 208A, second data processing unit 208B, third data processing unit 208C, and fourth data processing unit 208D may be an arithmetic logic unit (ALU), or any other suitable data processing unit. Further, memory wrapping logic 220 includes encoders 228A, 228B, 228C, 228D, data memory 230, ECC memory 240, decoders 240A, 240B, 240C, 240D, and error generation logic 242.

In this example, memory controller 202 receives input data 211 for processing, as well as an instruction 213. The input data 211 may be received from an on-chip component of integrated circuit 200, or from another integrated circuit (e.g., another component communicatively coupled to integrated circuit 200), for instance. The input data 211 is provided to one or more of the first data processing unit 208A, second data processing unit 208B, third data processing unit 208C, and fourth data processing unit 208D to generate corresponding processed data 209A, 209B, 209C, 209D. For example, one or more of the first data processing unit 208A, second data processing unit 208B, third data processing unit 208C, and fourth data processing unit 208D may perform an arithmetic operation (e.g., add, subtract, multiply, divide) or logic operation (E.g., OR, AND, XOR, etc.) on all or part of the input data 211 to generate the corresponding processed data 209A, 209B, 209C, 209D. Each of the processed data 209A, 209B, 209C, 209D may be a byte of data, for example.

Further, data storage logic 206 may receive the processed data 209A, 209B, 209C, 209D as well as the instruction 213. The instruction 213 may identify a type of storage to be made to data memory 230. For example, instruction 213 may identify a two byte write (e.g., half precision), a four byte write (e.g., single precision), or an eight byte write (e.g., double precision) to the data memory 230. Based on the instruction 213, data storage logic 206 may generate output data 207 comprising one or more of the processed data 209A, 209B, 209C, 209D. For instance, output data 207 may include four bytes of data when the instruction 213 identifies single precision. Data storage logic 206 provides the output data 207 to data memory 230 for storage. In addition, data storage logic 206 generates a byte identification signal 203 identifying to byte enable logic 204 which bytes to enable for writing. For example, byte identification signal 203 may identify a value between 0x1 and 0xF, inclusive, where each bit of the value indicates whether a corresponding byte (e.g., byte 0, byte 1, byte 2, byte 3) is to be enabled.

In response to receiving the byte identification signal 203, byte enable logic 204 provides one or more byte enable signals 205 to data memory 230. Data memory 230 then stores the output data 207 based on the byte enable signals 205. For instance, if the byte enable signals 205 enable a first byte (e.g., byte 0), data memory 230 stores a corresponding byte of the output data 207 in a first byte location 236A of memory location 236 of data memory 230 (e.g., a first byte location. Similarly, if the byte enable signals 205 enable a second byte (e.g., byte 1), data memory 230 stores a corresponding byte of the output data 207 in a second byte location 236B of memory location 236. If the byte enable signals 205 enable a third byte (e.g., byte 2), data memory 230 stores a corresponding byte of the output data 207 in a third byte location 236C of memory location 236. Moreover, if the byte enable signals 205 enable a fourth byte (e.g., byte 4), data memory 230 stores a corresponding byte of the output data 207 in a fourth byte location 236D of memory location 236.

In addition, encoders 228A, 228B, 228C, and 228D receive a corresponding byte of the output data 207, and generate a corresponding error correcting code 229A, 229B, 229C, and 229D. Each error correcting code 229A, 229B, 229C, and 229D may be, for instance, a block code or convolution code. The encoders 228A, 228B, 228C, and 228D may store the error correcting codes 229, including error correcting codes 229A, 229B, 229C, and 229D, in one or more memory locations 241. For instance, encoder 228A may store error correcting code 229A in a first memory location 241A (e.g., a first byte location). Similarly, encoder 228B may store error correcting code 229B in a second memory location 241B (e.g., a second byte location), encoder 228C may store error correcting code 229C in a third memory location 241C (e.g., a third byte location), and encoder 228D may store error correcting code 229D in a fourth memory location 241D (e.g., a fourth byte location).

Moreover, to detect any memory errors, one or more of decoders 240A, 240B, 240C, and 240D may obtain, from data memory 230, the output data 207 stored within, for example, memory location 236. In addition, the one or more of the decoders 240A, 240B, 240C, 240D obtain the corresponding error correcting codes 229 from ECC memory 240. For instance, and assuming four bytes of data are stored within the memory location 236, decoder 240A may obtain the byte of the output data 207 stored in the first byte location 236A. In addition, decoder 240B may obtain the byte of the output data 207 stored in the second byte location 236B, decoder 240C may obtain the byte of the output data 207 stored in the third byte location 236C, and decoder 240D may obtain the byte of the output data 207 stored in the fourth byte location 236D.

Decoders 240A, 240B, 240C, 240D may generate error correcting codes based on the obtained data. For instance, decoder 240A may generate a first error correcting code based on the byte of the output data 207 obtained from the first byte location 236A of the memory location 236 of data memory 230. In addition, decoder 240B may generate a second error correcting code based on the byte of the output data 207 obtained from the second byte location 236B of the memory location 236 of data memory 230. Similarly, decoder 240C may generate a third error correcting code based on the byte of the output data 207 obtained from the third byte location 236C of the memory location 236 of data memory 230, and decoder 240D may generate a fourth error correcting code based on the byte of the output data 207 obtained from the fourth byte location 236D of the memory location 236 of data memory 230. As illustrated, in at least some examples, each of the decoders 240A, 240B, 240C, and 240D do not receive or require the memory address from which the output data 207 was read from the data memory 230 to generate the error correcting codes.

In addition, decoder 240A may obtain error correcting code 241A, which corresponds to the byte of the output data 207 stored in the first byte location 236A of memory location 236 of the data memory 230, from the first memory location 241A of the ECC memory 240. Similarly, decoder 240B may obtain error correcting code 241B, which corresponds to the byte of the output data 207 stored in the second byte location 236B of memory location 236 of the data memory 230, from the second memory location 241B of the ECC memory 240. In addition, decoder 240C may obtain error correcting code 241C, which corresponds to the byte of the output data 207 stored in the third byte location 236C of memory location 236 of the data memory 230, from the third memory location 241C of the ECC memory 240. Decoder 240D may obtain error correcting code 241D, which corresponds to the byte of the output data 207 stored in the fourth byte location 236D of memory location 236 of the data memory 230, from the fourth memory location 241D of the ECC memory 240.

Decoders 240A, 240B, 240C, 240D may then compare the generated error correcting codes to the error correcting codes obtained from the ECC memory 240 to determine memory errors. For instance, decoder 240A may apply an "exclusive or" (XOR) logic operation (e.g., a bitwise XOR operation) to the generated error correcting code and the error correcting code obtained from the first memory location 241A to determine errors. If, for instance, the result of XOR logic operation is zero, then no errors are detected. Otherwise, if the result of the XOR logic operation is not zero, then at least one error has been detected. Further, decoders 240A, 240B, 240C, 240D may perform operations to generate error data characterizing any detected errors. For example, decoder 240A may generate first error signature 235A characterizing detected errors. The first error signature 235A may include three bits, where a value of 0b000 indicates no error, and a value of 0b001 indicates single error correction (SEC). In addition, a value of 0b010 may indicate double error detection (DED), and a value of 0b100 may indicate a check bit error. Similarly, decoder 240B may generate second error signature 235B characterizing any detected errors based on the generated error correcting code and the error correcting code obtained from the second memory location 241B. In addition, decoder 240C may generate third error signature 235C characterizing any detected errors based on the generated error correcting code and the error correcting code obtained from the third memory location 241C, and decoder 240D may generate fourth error signature 235D characterizing any detected errors based on the generated error correcting code and the error correcting code obtained from the fourth memory location 241D.

Error generation logic 242 obtains one or more of the first error signature 235A from the first decoder 240A, the second error signature 235B from the second decoder 240B, the third error signature 235C from the third decoder 240C, and the fourth error signature 235D from the fourth decoder 240D. Based on the one or more of the first error signature 235A, the second error signature 235B, the third error signature 235C, and the fourth error signature 235D, error generation logic 242 generates error status 243 characterizing whether errors were detected during decoding operations.

For example, error generation logic 242 may determine if any of the first error signature 235A, the second error signature 235B, the third error signature 235C, and the fourth error signature 235D indicate a first type of error, such as a DED error. For instance, the error generation logic 242 may determine if a value of any of the first error signature 235A, the second error signature 235B, the third error signature 235C, and the fourth error signature 235D matches a predetermined value of the first type of error (e.g., 0b010). If any of the first error signature 235A, the second error signature 235B, the third error signature 235C, and the fourth error signature 235D indicate the first type of error, the error generation logic 242 generates the error status 243 to indicate the first type of error. For instance, the error generation logic 242 may generate the error status 243 to include a value of 0b010. If, however, none of the first error signature 235A, the second error signature 235B, the third error signature 235C, and the fourth error signature 235D indicate the first type of error, the error generation logic 242 determines whether any of the first error signature 235A, the second error signature 235B, the third error signature 235C, and the fourth error signature 235D indicate a second type of error, such as an SEC error (e.g., value of 0b001). If any of the first error signature 235A, the second error signature 235B, the third error signature 235C, and the fourth error signature 235D indicate the second type of error, the error generation logic 242 generates the error status 243 to indicate the second type of error. If none of the first error signature 235A, the second error signature 235B, the third error signature 235C, and the fourth error signature 235D indicate the second type of error, the error generation logic 242 determines whether any of the first error signature 235A, the second error signature 235B, the third error signature 235C, and the fourth error signature 235D indicate a third type of error, such as a check bit error (e.g., value of 0b100). If any of the first error signature 235A, the second error signature 235B, the third error signature 235C, and the fourth error signature 235D indicate the third type of error, the error generation logic 242 generates the error status 243 to indicate the third type of error.

In some instances, the error status 243 may include two bits to identify up to four error types. In some instances, the error status 243 may include three bits to identify up to seven error types. In other instances, the error status 243 may include any suitable number of bits to identify error types. If none of the first error signature 235A, the second error signature 235B, the third error signature 235C, and the fourth error signature 235D indicate errors (e.g., values of 0b000), the error generation logic 242 does not generate the error status 243.

Further, in some examples, when the first error signature 235A, the second error signature 235B, the third error signature 235C, and the fourth error signature 235D indicate one or more errors, error generation logic 242 generates byte identification data 245 identifying which of the decoded bytes of 207 included an error. For instance, byte identification data 245 may include two bits, where a value of 0b00 indicates an error was detected for the first byte of the output data 207 (e.g., based on first error signature 235A). Similarly, a value of 0b01 indicates an error was detected for the second byte of the output data 207 (e.g., based on second error signature 235B), a value of 0b10 indicates an error was detected for the third byte of the output data 207 (e.g., based on third error signature 235C), and a value of 0b11 indicates an error was detected for the fourth byte of the output data 207 (e.g., based on fourth error signature 235D).

When generated, error generation logic 242 provides the error status 243 to ECC data buffer 212 (e.g., via a three bit bus). Further, ECC data buffer 212 stores the error status 243 within memory 216 of the ECC logging logic 214. Memory 216 may be, for example, a RAM memory, an NVRAM memory, a FLASH memory, a first-in-first-out (FIFO)

memory, or any other suitable memory. In some examples, ECC data buffer 212 stores the error status 243 in a next available memory location of the memory 216. For instance, assuming ECC data buffer 212 stored a previous error status 243 in a first location of memory 216, ECC data buffer 212 may store a currently received error status 243 in a second location of memory 216. The second location may consecutively follow the first location within memory 216.

As described herein, in some examples, error generation logic 242 further generates byte identification data 245 identifying one or more bytes of data that are associated with errors. In these examples, error generation logic 242 provides the byte identification data 245 to ECC data buffer 212 along with the corresponding error status 243 (e.g., a total of five bits, with two bits for the byte identification data, and three bits for the error status 243, via a five bit bus). ECC data buffer 212 stores the byte identification data 245 along with the corresponding error status 243 within the memory 216.

ECC logging logic 214 is configured to read memory 214, and to generate memory error signal 251 based on any stored error status 243 (and, in some examples, byte identification data 245). Memory error signal 251 may be an interrupt, such as a FUSA interrupt, for example. In some instances, ECC logging logic 214 may generate a first memory error signal 251, such as a FUSA_WARNING interrupt signal, if the error status 243 indicates a first type of error (e.g., SEC error), and may generate a second memory error signal 251, such as a FUSA_ERROR interrupt signal, if the error status 243 indicates a second type of error (e.g., DED error).

Figure 3:
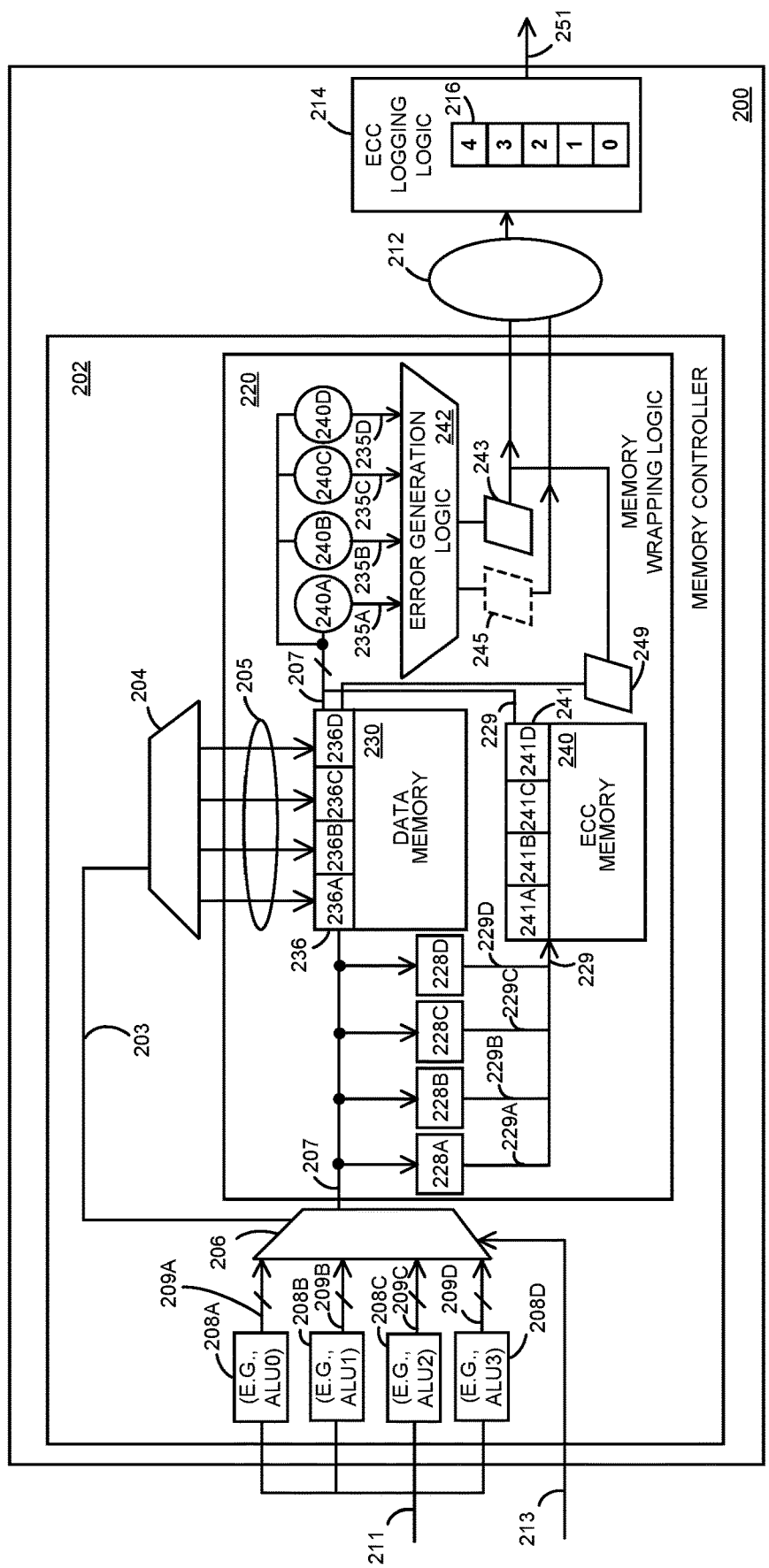
FIG. 3 is a block diagram of another integrated circuit, according to some implementations.

In some examples, ECC data buffer 212 further receives the memory address within data memory 230 storing the output data 207. For example, FIG. 3 illustrates the integrated circuit 200 of FIG. 2 in an alternate configuration where the ECC data buffer 212 additionally receives address data 249 from the data memory 230. As illustrated in this example, the decoders 240A, 240B, 240C, 240D do not receive the address data 249, thereby minimizing signals to each of the decoders 240A, 240B, 240C, 240D and thus of the integrated circuit 200. The address data 249 identifies the memory address of the output data 207 stored in data memory 230 and being provided to the decoders 240A, 240B, 240C, and 240D (e.g., memory address of memory location 236). In this example, the ECC data buffer 212 stores the address data 249 along with the corresponding error status 243 and, in some examples, corresponding byte identification data 245, within the memory 216 of ECC logging logic 214. The address data 249 may include any number of suitable bits to identify memory locations (e.g., relative memory locations) of data memory 230. In some examples, the address data 249 includes ten bits. Thus, in some examples, the ECC data buffer 212 may receive a three bit error status 243, and ten bit address data 249, for a total of thirteen bits of information to store in the memory 216 (e.g., via a thirteen bit bus). In other examples, the ECC data buffer 212 may receive a three bit error status 243, ten bit address data 249, and two bit byte identification data 245, for a total of fifteen bits of information to store in the memory 216 (e.g., via a fifteen bit bus).

Figure 5:
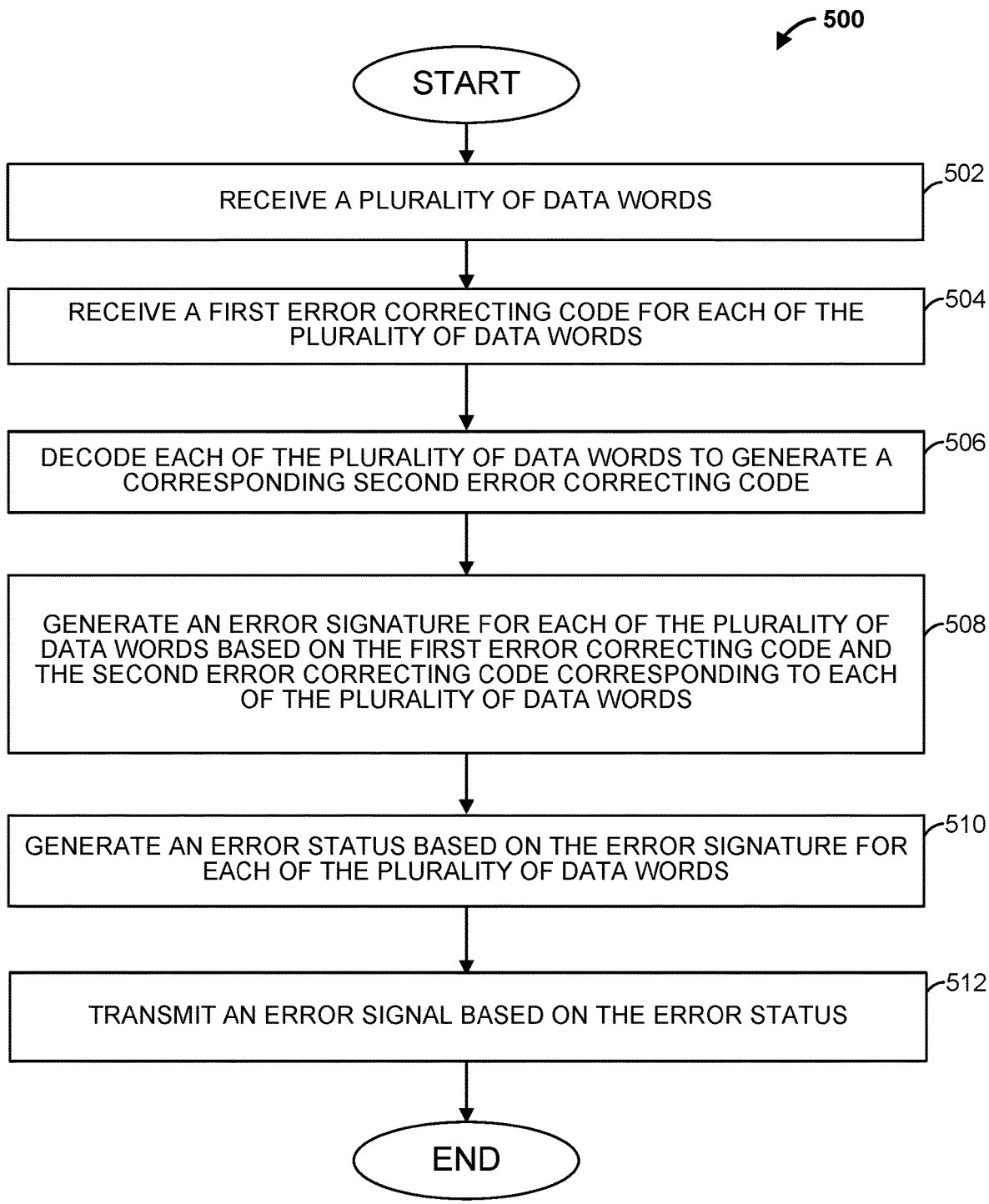
FIG. 5 is a flowchart of an exemplary process for detecting memory errors within electronic component assemblies, according to some implementations.

FIG. 5 is a flowchart of an exemplary process 500 for detecting memory errors within electronic component assemblies, and may be carried out by the die architectures described herein. For example, the memory controller 100 of FIG. 1, or the integrated circuit 200 of FIG. 2, may perform one or more of the operations of exemplary process 500.

Beginning at block 502, a plurality of data words are received. At block 504, a first error correcting code for each of the plurality of data words is received. For instance, as described herein, decoding logic 110 of memory controller 100 may receive multiple data bytes 103 from data memory 104, and corresponding error correcting codes 107 from ECC memory 108. Further, at block 506, each of the plurality of data words are decoded to generate a corresponding second error correcting code. For example, decoding logic 110 may perform operations to generate an error correcting code, such as a block code, for each of the plurality of data words, where the generated error correcting code is of a same type as that of the error correcting codes read from the data memory 104.

At block 508, an error signature is generated for each of the plurality of data words based on the first error correcting code and the second error correcting code corresponding to each of the plurality of data words. For instance, for each of the plurality of data words, decoding logic 110 may compare the corresponding first error correcting code and the corresponding second error correcting code to determine if they match. If the first error correcting code and the second error correcting code do not match (e.g., are not the same), decoding logic 110 detects one or more errors. Based on the comparisons, decoding logic 110 may generate error signatures 111 that identify the types of errors detected.

Moreover, at block 510, an error status is generated based on the error signatures for the plurality of data words. For example, as described herein, error generation logic 112 may receive the error signatures 111 from decoding logic 110, and may generate an error status 113 based on the error signatures 111. For example, error generation logic 112 may compare each error signature 111 to a first predetermined value (e.g., 0b010) to determine whether any error signature 111 indicates a first type of error. If at least one error signature 111 indicates the first type of error, error generation logic 112 generates the error status 113 to indicate the first type of error. If none of the error signatures 111 indicate the first type of error, error generation logic 112 then determines whether any of the error signatures 111 indicate a second type of error. If at least one error signature 111 indicates the second type of error, error generation logic 112 generates the error status 113 to indicate the second type of error. If none of the error signatures 111 indicate the second type of error, error generation logic 112 may continue to determine if any detect other types of errors as described herein.

Moreover, at block 512, an error signal is transmitted based on the error status. For example, ECC logging logic 154 may generate and transmit memory error signal 155 based on a received error status 113. The error signal may be an interrupt signal, such as a FUSA interrupt signal.

Figure 6:
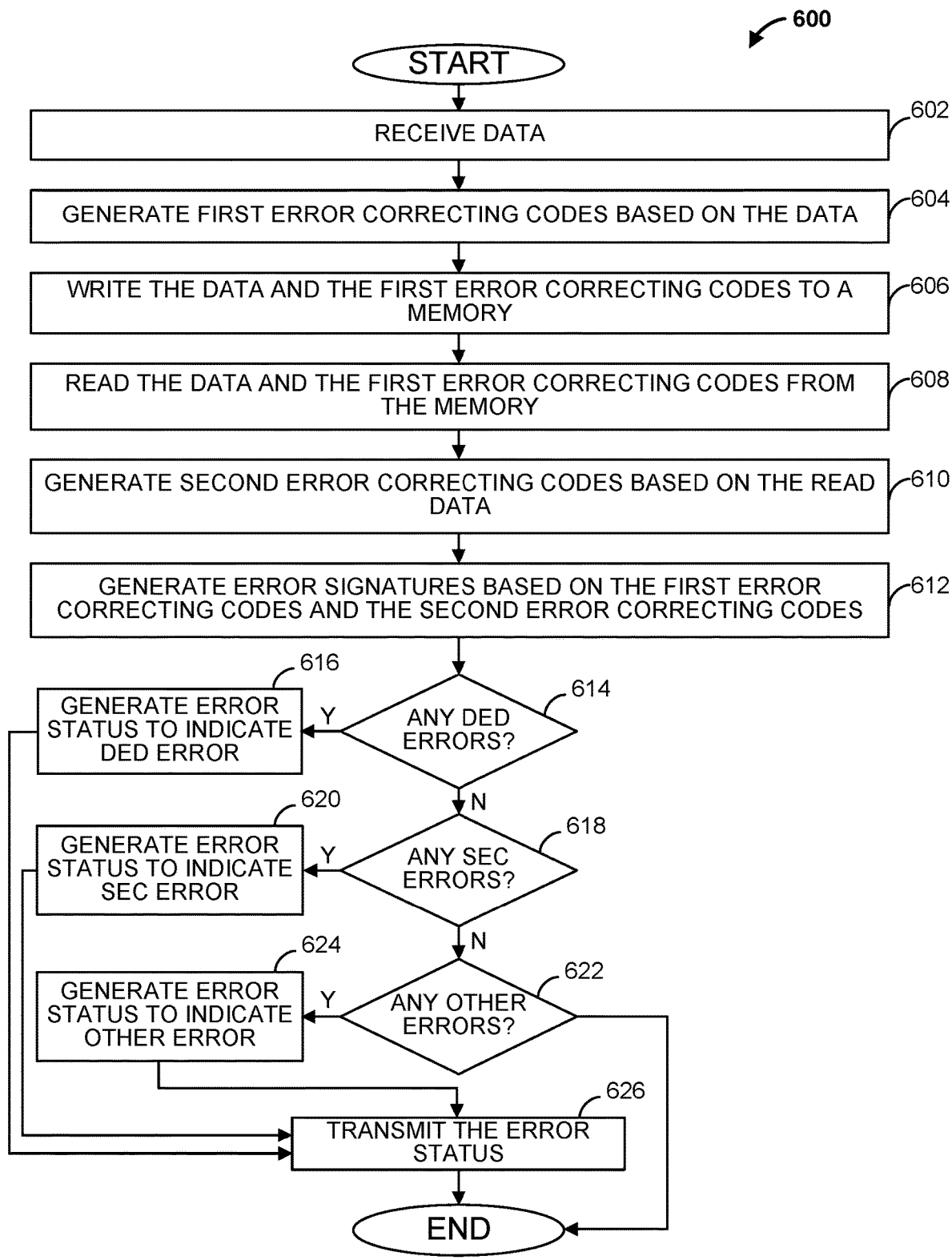
FIG. 6 is a flowchart of another exemplary process for detecting memory errors within electronic component assemblies, according to some implementations.

FIG. 6 is a flowchart of an exemplary process 600 for detecting memory errors within electronic component assemblies, and may be carried out by the die architectures described herein. For example, the memory controller 100 of FIG. 1, or the integrated circuit 200 of FIG. 2, may perform one or more of the operations of exemplary process 600.

Beginning at block 602, data is received. For example, as described herein, integrated circuit 200 may receive input data 211 for processing from on on-chip or off-chip component, and may generate output data 207 based on the processing. At block 604, first error correcting codes are generated based on the data. For instance, as described herein, encoders 228A, 228B, 228C, and 228D may receive a corresponding byte of the output data 207, and may generate an error correcting code 229A, 229B, 229C, and 229D, respectively. Each error correcting code 229A, 229B, 229C, and 229D may be, for instance, a block code or convolution code.

Additionally, at block 606, the data and the first error correcting codes are written to memory. For instance, the output data 207 may be stored in data memory 230, and the error correcting codes 229A, 229B, 229C, and 229D may be stored in ECC memory 240. Further, at block 608, the data and the first error correcting codes are read from the memory. At block 610, second error correcting codes are generated based on the read data. For example, as described herein, decoders 240A, 240B, 240C, and 240D may read the output data 207 from the data memory 230, and the corresponding error correcting codes 229A, 229B, 229C, and 229D from the ECC memory 240.

Further, at block 612, the first error correcting codes and the second error correcting codes are compared to generate error signatures. For instance, as described herein, each of the decoders 240A, 240B, 240C, and 240D may obtain a corresponding byte of the output data 207, and may generate an error signature 235A, 235B, 235C, and 235D, respectively, based on the obtained byte of the output data 207. The method then proceeds to block 614 to check if any of the error signatures indicate a first type of error, such as DED errors.

At block 614, if any of the error signatures indicate one or more DED errors, the method proceeds to block 616 where an error status is generated to indicate a DED error. For example, as described herein, if any of the first error signature 235A, the second error signature 235B, the third error signature 235C, and the fourth error signature 235D indicate a DED error, the error generation logic 242 generates the error status 243 to indicate the DED error. The method then proceeds to block 626 to transmit the generated error status (e.g., to an on-chip or off-chip component).

If, however, at block 614 there are no DED errors, the method proceeds to block 618 to check if any of the error signatures indicate a second type of error, such as SEC errors. At block 618, if any of the error signatures indicate one or more SEC errors, the method proceeds to block 620 where an error status is generated to indicate an SEC error. The method then proceeds to block 626 to transmit the generated error status.

If, however, at block 618 there are no SEC errors, the method proceeds to block 622 to check if any of the error signatures indicate any other types of errors. If, at block 622, any of the error signatures indicate one or more of any other types of errors, the method proceeds to block 624 where an error status is generated to indicate the other type of error (e.g., check bit error). The method then proceeds to block 626 to transmit the generated error status.

Implementation examples are further described in the following numbered clauses:

1. A die package comprising:
a memory device; and
a processor communicatively coupled to the memory device, the processor configured to:
receive a plurality of data words;
receive a first error correcting code for each of the plurality of data words;
generate, for each of the plurality of data words, a second error correcting code based on a corresponding one of the plurality of data words;
generate, for each of the plurality of data words, an error status based on the first error correcting code and the second error correcting code corresponding to each of the plurality of data words;
generate error data based on the error statuses for the plurality of data words; and
transmit an error signal to at least one component electrically coupled to the die package based on the error data.

2. The die package of clause 1, wherein the processor is configured to:
determine whether at least one of the error statuses for the plurality of data words indicate a first error type; and
generate the error data based on the determination.

3. The die package of clause 2, wherein the first error type is a double error detection error.

4. The die package of any of clauses 2-3, wherein the processor is configured to:
determine that the at least one of the error statuses for the plurality of data words indicate the first error type; and
generate the error data to include the first error type.

5. The die package of any of clause 2-4, wherein the processor is configured to:
determine that none of the error statuses for the plurality of data words indicate the first error type;
determine whether at least one of the error statuses for the plurality of data words indicate a second error type; and
generate the error data based on the determination.

6. The die package of clause 5, wherein the second error type is a single error correction error.

7 The die package of any of clauses 5-6, wherein the processor is configured to:
determine that none of the error statuses for the plurality of data words indicate the second error type;
determine whether at least one of the error statuses for the plurality of data words indicate a third error type; and
generate the error data based on the determination.

8. The die package of clause 7, wherein the third error type is a check bit error.

9. The die package of any of clauses 1-8, wherein the processor is configured to:
compare the first error correcting code and the second error correcting code corresponding to each of the plurality of data words; and
generate, for each of the plurality of data words, the error status based on the comparison.

10. The die package of clause 9, wherein the processor, to compare the first error correcting code and the second error correcting code corresponding to each of the plurality of data words, is configured to perform an exclusive or operation between the first error correcting code and the second error correcting code corresponding to each of the plurality of data words.

11. The die package of any of clauses 1-10, wherein the processor is configured to:
generate, based on the error statuses, word identification data identifying at least one of the plurality of data words; and
store the word identification data in the memory device.

12. The die package of any of clauses 1-11, wherein the processor is configured to:
receive a memory address of the plurality of data words; and
store the memory address in the memory device.

13. The die package of any of clauses 1-12, wherein the plurality of data words each comprise eight bits.

14. The die package of any of clauses 1-13, wherein the plurality of data words comprise four words.

15. A method by a processor comprising:
receiving a plurality of data words;

receiving a first error correcting code for each of the plurality of data words;

generating, for each of the plurality of data words, a second error correcting code based on a corresponding one of the plurality of data words;

generating, for each of the plurality of data words, an error status based on the first error correcting code and the second error correcting code corresponding to each of the plurality of data words;

generating error data based on the error statuses for the plurality of data words; and transmitting an error signal based on the error data.

16. The method of clause 15, further comprising:

determining whether at least one of the error statuses for the plurality of data words indicate a first error type; and generating the error data based on the determination.

17. The method of clause 16, wherein the first error type is a double error detection error.

18. The method of any of clauses 16-17, further comprising:

determining that the at least one of the error statuses for the plurality of data words indicate the first error type; and generating the error data to include the first error type.

19. The method of any of clauses 16-18, further comprising:

determining that none of the error statuses for the plurality of data words indicate the first error type;

determining whether at least one of the error statuses for the plurality of data words indicate a second error type; and generating the error data based on the determination.

20. The method of clause 19, wherein the second error type is a single error correction error.

21. The method of any of clauses 19-20, further comprising:

determining that none of the error statuses for the plurality of data words indicate the second error type;

determining whether at least one of the error statuses for the plurality of data words indicate a third error type; and generating the error data based on the determination.

22. The method of clause 21, wherein the third error type is a check bit error.

23. The method of any of clauses 15-22, further comprising:

comparing the first error correcting code and the second error correcting code corresponding to each of the plurality of data words; and generating, for each of the plurality of data words, the error status based on the comparison.

24. The method of clause 23, wherein, to compare the first error correcting code and the second error correcting code corresponding to each of the plurality of data words, the method further comprises performing an exclusive or operation between the first error correcting code and the second error correcting code corresponding to each of the plurality of data words.

25. The method of any of clauses 15-24, further comprising:

generating, based on the error statuses, word identification data identifying at least one of the plurality of data words; and storing the word identification data in the memory device.

26. The method of any of clauses 15-25, further comprising:

receiving a memory address of the plurality of data words; and storing the memory address in the memory device.

27. The method of any of clauses 15-26, wherein the plurality of data words each comprise eight bits.

28. The method of any of clauses 15-27, wherein the plurality of data words comprise four words.

29. A non-transitory, machine-readable storage medium comprises instructions that, when executed by at least one processor, cause the at least one processor to:

receive a plurality of data words;

receive a first error correcting code for each of the plurality of data words;

generate, for each of the plurality of data words, a second error correcting code based on a corresponding one of the plurality of data words;

generate, for each of the plurality of data words, an error status based on the first error correcting code and the second error correcting code corresponding to each of the plurality of data words;

generate error data based on the error statuses for the plurality of data words; and transmitting an error signal based on the error data.

30. The non-transitory, machine-readable storage medium of clause 29, wherein the instructions, when executed by the at least one processor, cause the at least one processor to:

determine whether at least one of the error statuses for the plurality of data words indicate a first error type; and generate the error data based on the determination.

31. The non-transitory, machine-readable storage medium of clause 30, wherein the first error type is a double error detection error.

32. The non-transitory, machine-readable storage medium of any of clauses 30-31, wherein the instructions, when executed by the at least one processor, cause the at least one processor to:

determine that the at least one of the error statuses for the plurality of data words indicate the first error type; and generate the error data to include the first error type.

33. The non-transitory, machine-readable storage medium of any of clauses 30-32, wherein the instructions, when executed by the at least one processor, cause the at least one processor to:

determine that none of the error statuses for the plurality of data words indicate the first error type;

determine whether at least one of the error statuses for the plurality of data words indicate a second error type; and generate the error data based on the determination.

34. The non-transitory, machine-readable storage medium of clause 33, wherein the second error type is a single error correction error.

35. The non-transitory, machine-readable storage medium of any of clauses 33-34, wherein the instructions, when executed by the at least one processor, cause the at least one processor to:

determine that none of the error statuses for the plurality of data words indicate the second error type;

determine whether at least one of the error statuses for the plurality of data words indicate a third error type; and generate the error data based on the determination.

36. The non-transitory, machine-readable storage medium of clause 35, wherein the third error type is a check bit error.

37. The non-transitory, machine-readable storage medium of any of clauses 29-36, wherein the instructions, when executed by the at least one processor, cause the at least one processor to:
compare the first error correcting code and the second error correcting code corresponding to each of the plurality of data words; and
generate, for each of the plurality of data words, the error status based on the comparison.

38. The non-transitory, machine-readable storage medium of clause 37, wherein to compare the first error correcting code and the second error correcting code corresponding to each of the plurality of data words, the instructions, when executed by the at least one processor, cause the at least one processor to perform an exclusive or operation between the first error correcting code and the second error correcting code corresponding to each of the plurality of data words.

39. The non-transitory, machine-readable storage medium of any of clauses 29-38, wherein the instructions, when executed by the at least one processor, cause the at least one processor to:
generate, based on the error statuses, word identification data identifying at least one of the plurality of data words; and
store the word identification data in the memory device.

40. The non-transitory, machine-readable storage medium of any of clauses 29-39, wherein the instructions, when executed by the at least one processor, cause the at least one processor to:
receive a memory address of the plurality of data words; and
store the memory address in the memory device.

41. The non-transitory, machine-readable storage medium of any of clauses 29-40, wherein the plurality of data words each comprise eight bits.

42. The non-transitory, machine-readable storage medium of any of clauses 29-41, wherein the plurality of data words comprise four words.

43. A die package comprising:
decoder logic configured to:
receive a plurality of data words;
receive a first error correcting code for each of the plurality of data words;
generate, for each of the plurality of data words, a second error correcting code based on a corresponding one of the plurality of data words;
and generate, for each of the plurality of data words, an error status based on the first error correcting code and the second error correcting code corresponding to each of the plurality of data words; and
error generation logic configured to:
receive the error status for each of the plurality of data words;
generate error data based on the error statuses for the plurality of data words; and
transmit an error signal to at least one component electrically coupled to the die package based on the error data.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code that, when executed, causes a machine to fabricate at least one integrated circuit that performs one or more of the operations described herein. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for causing a machine to fabricate the integrated circuit. The methods may also be at least partially embodied in the form of a computer into which computer program code is loaded or executed, such that, the computer becomes a special purpose computer for causing a machine to fabricate the integrated circuit. For instance, when implemented on a general-purpose processor, computer program code segments can configure the processor to create specific logic circuits. The methods may alternatively be at least partially embodied in application specific integrated circuits or any other integrated circuits for performing the methods.

In addition, terms such as "circuit," "circuitry," "logic," and the like can include, alone or in combination, analog circuitry, digital circuitry, hardwired circuitry, programmable circuitry, processing circuitry, hardware logic circuitry, state machine circuitry, and any other suitable type of physical hardware components. Further, the embodiments described herein may be employed within various types of devices such as networking devices, telecommunication devices, smartphone devices, gaming devices, enterprise devices, storage devices (e.g., cloud storage devices), automobile systems (e.g., collision avoidance systems, object detection systems, navigation systems, etc.), and computing devices (e.g., cloud computing devices), among other types of devices.

The subject matter has been described in terms of exemplary embodiments. Because they are only examples, the claimed inventions are not limited to these embodiments. Changes and modifications may be made without departing the spirit of the claimed subject matter. It is intended that the claims cover such changes and modifications.

We claim:

1. A memory controller die package comprising:
a data memory device;
decoder logic circuitry communicatively and electrically coupled to the data memory device, the decoder logic circuitry configured to:
receive a plurality of data words from the data memory device;
receive a first error correcting code (ECC) for each of the plurality of data words from an ECC memory device coupled to the decoder logic circuitry;
generate, for each of the plurality of data words, a second error correcting code based on a corresponding one of the plurality of data words;
generate, for each of the plurality of data words, an error signature based on the first error correcting code and the second error correcting code corresponding to each of the plurality of data words;
error generation logic circuitry communicatively and electrically coupled to the decoder logic circuitry, the error generation logic circuitry configured to:

generate a single error status based on the error signatures for the plurality of data words, the single error status indicating a consolidated error for the plurality of data words; and ECC logging logic circuitry communicatively and electrically coupled to the error generation logic circuitry, ECC logging logic circuitry configured to:
generate and transmit an error signal based on the single error status to at least one component electrically coupled to the memory controller die package.

2. The memory controller die package of claim 1, wherein the error generation logic circuitry is configured to:
determine whether at least one of the error signatures for the plurality of data words indicate a first error type; and
generate the single error status based on the determination.

3. The memory controller die package of claim 2, wherein the first error type is a double error detection error.

4. The memory controller die package of claim 2, wherein the error generation logic circuitry is configured to:
determine that the at least one of the error signatures for the plurality of data words indicate the first error type; and
generate the single error status to include the first error type.

5. The memory controller die package of claim 2, wherein the error generation logic circuitry is configured to:
determine that none of the error signatures for the plurality of data words indicate the first error type;
determine whether at least one of the error signatures for the plurality of data words indicate a second error type; and
generate the single error status based on the determination.

6. The memory controller die package of claim 5, wherein the second error type is a single error correction error.

7. The memory controller die package of claim 5, wherein the error generation logic circuitry is configured to:
determine that none of the error signatures for the plurality of data words indicate the second error type;
determine whether at least one of the error signatures for the plurality of data words indicate a third error type; and
generate the single error status based on the determination.

8. The memory controller die package of claim 7, wherein the third error type is a check bit error.

9. The memory controller die package of claim 1, wherein the decoder logic circuitry is configured to:
compare the first error correcting code and the second error correcting code corresponding to each of the plurality of data words; and
generate, for each of the plurality of data words, the error signature based on the comparison.

10. The memory controller die package of claim 9, wherein the decoder logic circuitry, to compare the first error correcting code and the second error correcting code corresponding to each of the plurality of data words, is configured to perform an exclusive or operation between the first error correcting code and the second error correcting code corresponding to each of the plurality of data words.

11. The memory controller die package of claim 1, wherein the decoder logic circuitry is configured to:
generate, based on the error signatures, word identification data identifying at least one of the plurality of data words.

12. The memory controller die package of claim 1, wherein the decoder logic circuitry is configured to:
receive a memory address of the plurality of data words.

13. The memory controller die package of claim 1, wherein the plurality of data words each comprise eight bits.

14. The memory controller die package of claim 1, wherein the plurality of data words comprise four words.

15. A method performed by a memory controller die package, the method comprising:
decoder logic circuitry receiving a plurality of data words;
the decoder logic circuitry receiving a first error correcting code (ECC) for each of the plurality of data words;
the decoder logic circuitry generating, for each of the plurality of data words, a second error correcting code based on a corresponding one of the plurality of data words;
the decoder logic circuitry generating, for each of the plurality of data words, an error signature based on the first error correcting code and the second error correcting code corresponding to each of the plurality of data words;
error generation logic circuitry communicatively and electrically coupled to the decoder logic circuitry, the error generation logic circuitry generating a single error status based on the error signatures for the plurality of data words, the single error status indicating a consolidated error for the plurality of data words; and
ECC logging logic circuitry communicatively and electrically coupled to the error generation logic circuitry, the ECC logging logic circuitry generating and transmitting an error signal based on the single error status.

16. The method of claim 15, further comprising:
the error generation logic circuitry determining whether at least one of the error signatures for the plurality of data words indicate a first error type; and
generating the single error status based on the determination.

17. The method of claim 16, further comprising:
the error generation logic circuitry determining that the at least one of the error signatures for the plurality of data words indicate the first error type; and
generating the single error status to include the first error type.

18. The method of claim 16, further comprising:
the error generation logic circuitry determining that none of the error signatures for the plurality of data words indicate the first error type;
the error generation logic circuitry determining whether at least one of the error signatures for the plurality of data words indicate a second error type; and
generating the single error status based on the determination.

* * * * *